United States Patent
Suga et al.

(10) Patent No.: US 7,536,063 B2
(45) Date of Patent: May 19, 2009

(54) RESOLUTION CONVERSION METHOD AND DEVICE

(75) Inventors: Kazumi Suga, Kanagawa-ken (JP); Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 11/038,240

(22) Filed: Jan. 21, 2005

(65) Prior Publication Data
US 2005/0163400 A1    Jul. 28, 2005

(30) Foreign Application Priority Data
Jan. 27, 2004    (JP)    ............... 2004-018797

(51) Int. Cl.
*G06K 9/32* (2006.01)
*G06K 9/36* (2006.01)

(52) U.S. Cl. ............... 382/299; 382/276; 375/E7.135; 375/E7.187; 375/E7.252

(58) Field of Classification Search ............... 382/276, 382/299; 375/E7.135, E7.187, E7.19, E7.252
See application file for complete search history.

(56) References Cited

U.S. PATENT DOCUMENTS

| | | | |
|---|---|---|---|
| 5,838,378 A | * | 11/1998 | Nakagawa et al. ..... 375/240.12 |
| 6,157,414 A | | 12/2000 | Sakamoto ............... 348/581 |
| 6,263,119 B1 | | 7/2001 | Martucci ............... 382/298 |

FOREIGN PATENT DOCUMENTS

| | | |
|---|---|---|
| EP | 0 955 609 A1 | 11/1999 |
| EP | 1 401 210 A1 | 3/2004 |
| JP | 2-057067 | 2/1990 |
| JP | 2-076472 | 3/1990 |
| JP | 8-294001 | 11/1996 |
| JP | 11-252356 | 9/1999 |
| JP | 2000-299859 | 10/2000 |
| KR | 10-0376060 | 3/2003 |
| WO | WO 02/093935 | 11/2002 |

OTHER PUBLICATIONS

Search Report in EP 05 00 1427.

* cited by examiner

*Primary Examiner*—Samir A. Ahmed
*Assistant Examiner*—Stephen R Koziol
(74) *Attorney, Agent, or Firm*—Fitzpatrick, Cella, Harper & Scinto

(57) ABSTRACT

Provided a resolution conversion method, which converts the resolution of an image by using orthogonal transform, and in which block noise reduction processing is performed according to the increasing magnification of the image.

1 Claim, 5 Drawing Sheets

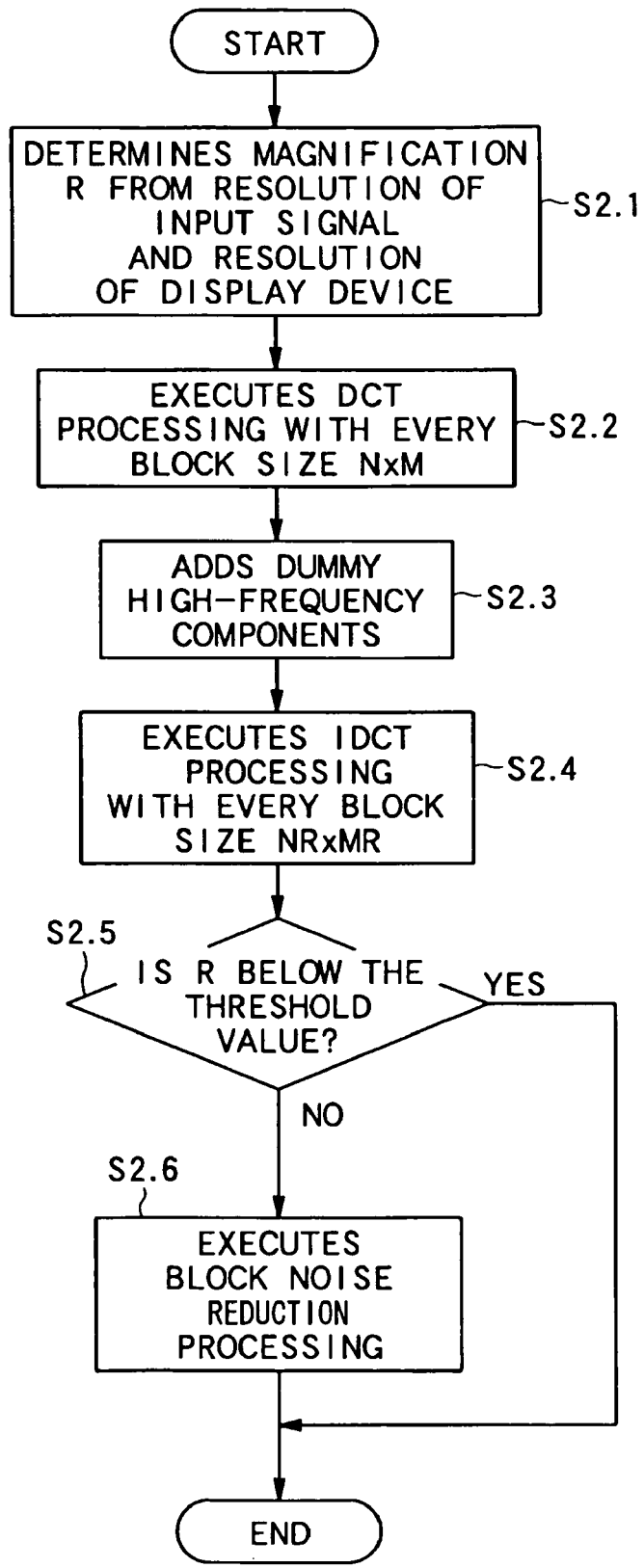

BLOCK BORDER

BLOCK BORDER (CORNER)

RESOLUTION CONVERSION METHOD AND DEVICE

BACKGROUND OF THE INVENTION

1. Field of the Invention

The present invention relates to a method of and a device for resolution conversion. More particularly, the invention concerns a method of and a device for resolution conversion, which, when performing a resolution conversion by using a DCT (orthogonal transform) technique, enable reducing block noises in a simple manner.

2. Description of the Related Art

Conventionally, as a method for resolution conversion (increasing/reduction an image), there have generally been used "nearest neighbor interpolation" (Nearest Neighbor), linear interpolation (Bi-Linear), cubic convolution interpolation (Cubic Convolution), etc. When increasing an image, pixels are interpolated using the interpolation technique, whereas, when reduction an image, pixels are thinned while they are being interpolated using the interpolation technique, or only thinning alone of pixels is performed. Each of these techniques performs up-sampling or down-sampling on discrete sampled data in the time/space domains, and uses an FIR (Finite Impulse Response) filter as low-pass filter processing for preventing the occurrence of return distortion. In these techniques using the FIR filter, it becomes a key how to use an FIR filter whose characteristic is near to an ideal low pass characteristic to the largest possible extent. In general, by increasing the number of taps of filter to thereby prepare a filter having a characteristic of $f=\sin(\pi x)/(\pi x)$, i.e., a characteristic near to the so-called Sinc function, and to use the filter approximated with a finite length. Obviously, the larger the number of the taps is, the nearer to the Sinc function the characteristic is. However, the higher the cost becomes accordingly.

Also, further, there has also been proposed a resolution conversion method that is done not within the above-described time/space domain (temporal domain) but within the frequency domain. The resolution conversion method that is done within that frequency domain will now be explained using FIGS. 4A to 4C. For example, using orthogonal transform such as DCT (Discrete Cosine Transform), input image data is converted into frequency domain data per every block. FIG. 4A illustrates a case where the input data is converted every N×M (for example 8×8) size through the use of the DCT. FIG. 4B illustrates DCT coefficients of each block and, in this figure, a left upper corner pixel is a DC component, and, toward the right and bottom, the pixels become AC high-frequency components.

For increase, to the outside of the high-frequency domain components that are on the right and lower side of the block, there are added dummy high-frequency domain components (in the example of FIG. 4C, X pixels and Y pixels that respectively serve as dummy high-frequency domain components are added to the outside of the block of N×M to provide a block size of (N+X)×(M+Y)). For the every increased block, inverse orthogonal transform such as inverse DCT is performed to thereby convert again into the data within the time/space domain (temporal domain). On the other hand, in a case where decrease the image, conversely, the high-frequency domain components of the input signal are disposed away, and, for the every reduced block, inverse orthogonal transform such as inverse DCT is performed on the relevant data.

As the above-described resolution conversion method using orthogonal transform such as DCT, there have hitherto been proposed a method in which, as in, for example, Japanese Patent Application Laid-Open No. 2-76472, zero (0) are added as the dummy high-frequency domain components, a method in which, as in, for example, Japanese Patent Application Laid-Open No. 8-294001 that is mentioned below, frequency components obtained by transforming the input signal frequency components according to a prediction rule that has been prepared beforehand are added as dummy high-frequency domain components, etc.

However, in the above-described resolution conversion method using DCT, when increase, there occur the noises that are shaped like grating and that are called "block noises".

As a method of reduction these block noises that occur when performing the resolution conversion in which DCT is used, there has been proposed a method in which, as in Japanese Patent Application Laid-Open No. 11-252356, DCT and inverse DCT are performed on the blocks in such a manner as the blocks are overlapped.

On the other hand, when compressing an MPEG (Moving Picture Experts Group)-2 used in a digital broadcasting, also, similarly, block noises occur. A lot of proposals have hitherto been made regarding the block noise reduction processing at the compressing time. However, when performing the block noise reduction processing with respect to every block border, blur occurs at the edge part of the image. Therefore, ordinarily, first, determination processing is performed with respect to between the edge part and the block noise part, then block noise reduction processing is performed. For example, a method wherein as in Japanese Patent Application Laid-Open No. Hei-2-57067 there is determined the value of difference between the border lines of the relevant two blocks; and, if the value of difference is small, it is determined that block noise is occurring, to thereby perform low-pass filter processing, or a method wherein as in Japanese Patent Application Laid-Open No. 2000-299859 there is detected the block containing only the high-frequency domain components the quantity of which is not larger than a relevant threshold value, whereby block noise reduction processing is performed with respect to only the block alone, or etc. has hitherto been proposed.

SUMMARY OF THE INVENTION

However, in case of the above-described method wherein blocks are overlapped, if the block is increased in size, the problem arises that the load in processing becomes acceleratedly heavy. Also, in case of the above-described method wherein block noise processing such as low-pass filter processing is performed detecting the occurrence of block noises on the basis of the value of difference between the block borders and the high-frequency components within the block, it is necessary to perform block-noise occurrence detection processing. In addition, it was also difficult to perform accurate detection.

The present invention has been made in view of the above-described points of problem and has an object to provide a method and a device for resolution conversion, based on the use of orthogonal transform, which do not necessitate performing the discrimination processing with respect to between block noises and image edges and can simply reduce block noises and are freed from the occurrence of blur due to the mis-recognizing of the edge parts as the block borders, namely, which can reduce block noises and simplify the block noise reduction processing.

The present invention is characterized in that, in a resolution conversion method, the resolution conversion method being adapted to convert the resolution of an image by using orthogonal transform, block noise reduction processing is performed according to the increasing magnification of the image.

Also, the present invention is characterized in that, a resolution conversion apparatus, being adapted to convert the resolution of an image, comprising:

orthogonal transform means that converts an input signal into a frequency domain signal with use of an orthogonal transform;

dummy high-frequency component adding means that produces dummy high-frequency domain components to a high-frequency domain side of the converted frequency domain signal in accordance with the increasing magnification of the image;

inverse orthogonal transform means that converts the signal having added thereto the dummy high-frequency domain components into a time/space domain signal with use of an inverse orthogonal transform;

image processing means that performs block noise reduction processing in accordance with the increasing magnification of the image; and control means that controls the orthogonal transform means, dummy high-frequency component adding means, inverse orthogonal transform means, and image processing means in accordance with the increasing magnification of the image.

According to the present invention, in the method for resolution conversion that uses orthogonal transform, in addition that block noises can be reduced, the block noise reduction processing also be more simplified than in the prior art.

BRIEF DESCRIPTION OF THE DRAWINGS

FIG. 2 is a flow chart explaining a resolution conversion method according to the first embodiment of the present invention;

DETAILED DESCRIPTION OF THE PREFERRED EMBODIMENTS

First Embodiment

Figure 1:
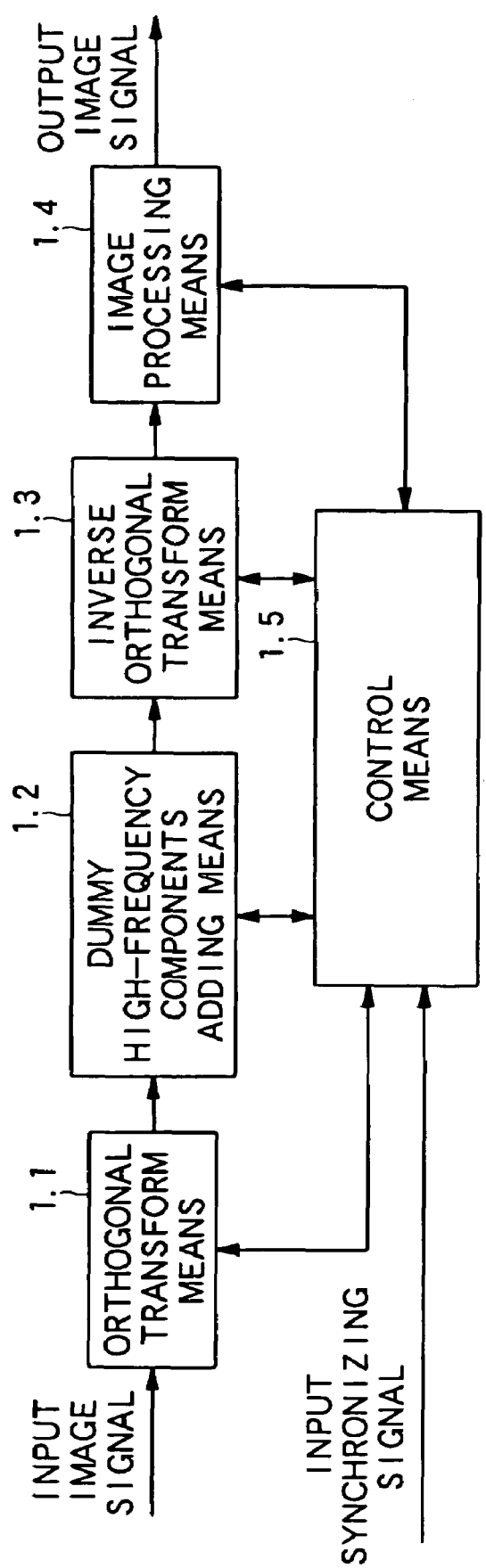
FIG. 1 is a block diagram illustrating a construction example of a resolution conversion device according to a first embodiment of the present invention.

A method and a device for resolution conversion according to a first embodiment of the present invention with reference to a block diagram of FIG. 1 and a flow chart of FIG. 2.

First, the flow of processing that is to be performed in the method for resolution conversion according to the first embodiment of the present invention will be explained with reference to a flow chart of FIG. 2.

The increasing magnification (hereinafter referred as R) of an image is determined from the resolution of the input signal and the resolution of a display device (not illustrated) (s2.1).

For example, if the resolution of the input signal is composed of 640×480 pixels and the resolution of the display device is composed of 1280×960 pixels, the R is 2. Although the value of the R may be different according to a respective one of the horizontal and vertical directions, for brevity of explanation the following explanation will be made using the same value of increasing magnification with respect to the both directions.

Subsequently, with one block having a size composed of N×M (for example both the N and the M are 8) pixels, orthogonal transform processing such as DCT processing is performed every block, thereby converting from a time/space domain signal into a frequency domain signal (s2.2).

Figure 4A:
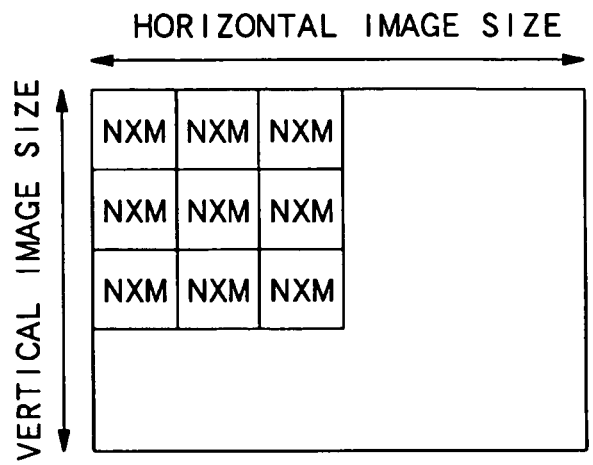
FIGS. 4A to 4C are conceptual views explaining processing performed with orthogonal transform means and inverse orthogonal transform means according to the embodiment of the present invention.
Figure 4B:
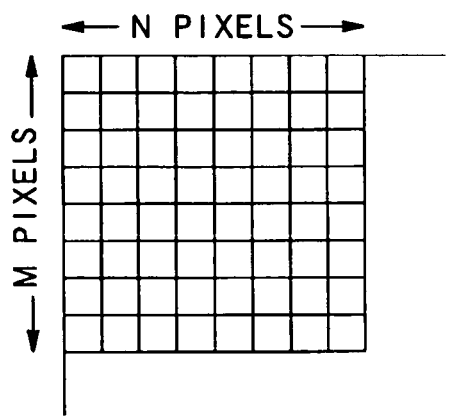
Figure 4C:
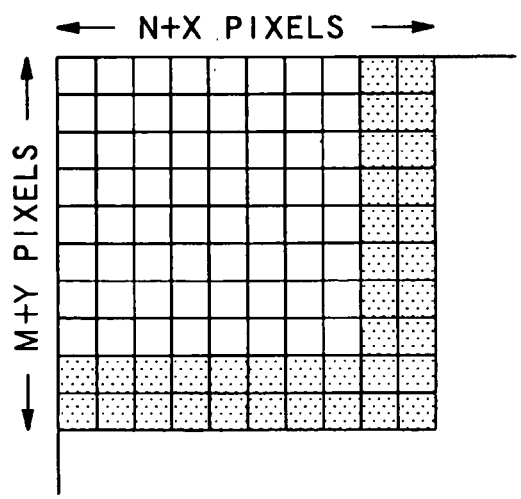

And, as illustrated in FIGS. 4A to 4C, to the outside of the high-frequency domain components that correspond to the right and bottom sides of each block, there are added dummy high-frequency domain components (s2.3, in the example of FIG. 4C, to the outside of the N×M block there are respectively added X and Y pixels as dummy high-frequency domain components, thereby making the block have a size of (N+X)×(M+Y). Also, in other words, the block size can also be referred to as "NR×MR".) In this case, if each of the N and M is provided as 8 and the magnification R is provided as described above (R:2), the resulting each of the X and Y is 8.

Further, inverse orthogonal transform such as IDCT (inverse DCT) is performed every block having added thereto the above-described dummy high-frequency components, thereby converting from a frequency domain signal into a time/space domain signal (s2.4).

And, in the first embodiment of the present invention, when the above-described increasing magnification R is smaller than a threshold value that is preset, any block noise reduction processing is not performed and, only when otherwise (s2.5), block noise reduction processing is performed (s2.6). As this threshold value that is preset, it is confirmed through evaluation of the image quality that, in a case where each of the above-described both N and M defining a block size is 8, that threshold value suitably is a magnification of 10/8 to 20/8, especially more preferably a magnification of 14/8.

Subsequently, a device for resolution conversion according to the first embodiment of the present invention will now be explained with reference to the block diagram of FIG. 1.

The block of FIG. 1 is constructed by an orthogonal transform means 1.1, dummy high-frequency component adding means 1.2, inverse orthogonal transform means 1.3, image processing means 1.4, and control means 1.5.

(Orthogonal Transform Means)

The orthogonal transform means 1.1 performs orthogonal transform on a time/space domain signal that has been input to thereby convert it into a space frequency domain signal. As a method for performing orthogonal transform, there are Fast Fourier Transform (FFT), Discrete Cosine Transform (DCT), Hadamard Transform, Haar Transform, etc. Among these transforms, the discrete cosine transform has most widely been used in the applied field of industry, and its transforming expression is shown below as the equation (1). Although the following explanation will now be given under the assumption that the method for orthogonal transform in the embodiment of the present invention be DCT, the method for resolution conversion according to the present invention is not restricted by that method for orthogonal transform.

[Equation 1]

$$F_{uv} = \frac{2c(u)c(v)}{(NM)^{1/2}} \sum_{n=0}^{N-1} \sum_{m=0}^{M-1} f_{nm} \cos\left\{\frac{(2n+1)u\pi}{2N}\right\} \cos\left\{\frac{(2m+1)v\pi}{2M}\right\} \quad (1)$$

Here, $0 \leq u \leq N-1$, $0 \leq v \leq M-1$ $c(k) = 2^{-1/2}$ (when $k=0$)

$c(k) = 1$ (when $k \neq 0$)  [Equation 2]

In the equation (1), the N and M respectively represent the horizontal and vertical sizes of one block, and relevant processing is performed in such a way that, as in FIG. 4A, a one-frame input image is divided into unit blocks each of which has horizontal N pixels and vertical M pixels. Among the signals, in case of a brightness signal, it is preferable from the standpoint of block noises etc. that as the block size one block has 16 or more pixels both in the horizontal direction and in the vertical direction. Obviously, the whole image may be handled as one block without dividing it into blocks. However, as the block size is increased, the circuit scale increases in the way of an exponential function.

(Dummy High-Frequency Component Adding Means)

Next, the dummy high-frequency component adding means 1.2 will be explained. In the dummy high-frequency component adding means 1.2, dummy high-frequency components are added to the high-frequency domain side of the input signal in accordance with the value of increasing magnification that increases. As stated previously, in the examples of, for example, FIGS. 4A to 4C, in case of FIG. 4C, X pixels and Y pixels are added as dummy high-frequency domain components to the outside of the N×M block, thereby the resulting block is made to have a size of (N+X)×(M+Y). Assume now that each the N and M be 8 and the image be magnified to 1.5 times as large. Then, each the X and Y become 4. The dummy high-frequency components that should be added, as stated before, may be the value (0), or may be an alias component for the input signal. The kind of the dummy high-frequency component that is added does not restrict the scope of the invention.

Incidentally, the signal components that have been input are allotted as are to the components of the low-frequency domain side, however, gain adjustment is performed in accordance with the increasing magnification that is increased. Namely, for example, if the data is magnified to 1.5 times as increasing, the gain of the signal needs to be made 1.5 times as increasing.

(Inverse Orthogonal Transform Means)

The inverse orthogonal transform means 1.3 performs inverse orthogonal transform on the signal that has been obtained by dummy high-frequency components' being added, in the above-described dummy high-frequency component adding means 1.2, to the high-frequency domain side of the post-orthogonal-transform input signal, to thereby convert the signal into a time/space domain signal. However, the inverse orthogonal transform is also performed by dividing into unit blocks as in the case of the above-described orthogonal transform means 1.1. More specifically, as was explained in regarding with the dummy high-frequency component adding means 1.2, for example, orthogonal transform is performed with respect to the input signal with the block size being 8×8. In a case where the magnification of the data is 1.5 times as increasing, each block size becomes 12×12 because dummy high-frequency components are added to the high-frequency domain side (see FIGS. 4A to 4C). Inverse orthogonal transform is performed with respect to each 12×12 sized block.

(Image Processing Means)

Subsequently, the image processing means 1.4 will be explained. The image processing means 1.4 performs block noise reduction processing on the image signal that has been increased by the above-described orthogonal transform means 1.1, dummy high-frequency component adding means 1.2, and inverse orthogonal transform means 1.3, under the control of control means 1.5 as later described.

Here, an explanation will now be given of the reason why the invention does not necessitate the discrimination processing between the edge part of the image and the block noise part, the performance of which was needed in the above-described conventional technique.

Originally, block noises occur as follows. Namely, in a case of MPEG compressing for example, as the compressibility increases, the high-frequency components gradually become zero, and, as this goes on, the error between the DC components, which is an average brightness within the block, increases. As a result of this, tone difference occurs between adjacent two of the blocks at their border. The occurrence of the tone difference was the mechanism of the block noise occurrence. In the resolution conversion processing, as well, according to the invention, which uses orthogonal transform, as the increasing magnification increases, the values of zero (0), the alias components, or etc. are inserted as the high-frequency components. Therefore, the error between the DC components becomes large, resulting in that block noises come to intensively occur. Accordingly, as the increasing magnification increases, block noises come to intensively occur. By conceiving this fact, the invention determines, according to the magnification, whether block noise reduction processing should be performed. By doing so, detecting of the block noise occurrence becomes unneeded, with the result that the whole processing becomes simplified. Incidentally, in case of decrease an image in size, no problem arises with the occurrence of block noises and, therefore, in the block noise reduction processing of the invention, care is taken only of the case of increase.

The image processing means 1.4 will now be explained with reference to the relevant drawing. In the first embodiment of the present invention, through the control performed from the control means 1.5 as later described, block noise reduction processing is executed in a case where the increasing magnification is equal to or greater than a threshold value that is preset.

An example of the block noise reduction processing that is performed here in the embodiment will now be explained using FIGS. 3A and 3B.

The block noise reduction processing which in the first embodiment of the present invention is performed when the increasing magnification is equal to or greater than a threshold value that is preset is, for example, averaging processing that uses peripheral pixels. FIG. 3A illustrates the block border that has been viewed in the vertical direction, while FIG. 3B illustrates the border (corner) regarding both of the horizontal and vertical directions. In FIG. 3A, the pixel S2 that is located at the block border that is viewed in the vertical direction (the same is also obviously true in the horizontal direction as well) is replaced with an average value of the pixels S1 and S3 on both sides of that pixel S2. Also, in FIG.

3B, the pixel T3 that is at the border in both of the horizontal and vertical directions is replaced with an average value of its peripheral pixels T1, T2, T4, and T5. Although the above-described block noise reduction processing refers to a case where it is a so-called "boxcar low pass filter", in the first embodiment of the present invention the method for performing block noise reduction processing may be other ones. The first embodiment of the present invention is not limited to that block noise reduction processing method.

(Control Means)

For the control means 1.5, horizontal and vertical increasing magnifications are determined according to the resolution of the input signal as well as to the resolution of the display device. Here, the resolution of the input signal may be given from outside the control means 1.5, or, as illustrated in FIG. 1, it may be determined in the control means 1.5 from the frequency and polarity of an input synchronizing signal. Also, obviously, it may be given from the outside as a magnifying factor.

And, the control means 1.5 controls the orthogonal transform means 1.1 so that the input signal may be DCT processed with a preset value being used as its block size. And, the control means 1.5 controls the dummy high-frequency component adding means 1.2 and inverse orthogonal transform means 1.3 so that dummy high-frequency component adding and inverse orthogonal transform may be performed in accordance with the above-described increasing magnification.

Further, as described above, in a case where the above-described increasing magnification is larger than the threshold value that is preset, the control means 1.5 controls the image processing means 1.4 so that block noise reduction processing may be performed.

Second Embodiment

Subsequently, a second embodiment of the present invention will be explained. In the first embodiment of the present invention, only in a case where the increasing magnification is larger than a threshold value that is preset, block noise reduction was performed in the image processing means 1.4. However, in the second embodiment of the present invention, block noise reduction processing is performed not in such a manner that it is performed in two stages, i.e. turned ON and OFF, but, by adding in the vicinity of a threshold value a mode in which a small load of reduction processing operation is performed, in such a manner that it is performed in three stages, i.e. turned OFF, as first block noise reduction processing, and as second block noise reduction processing.

Figure 5:
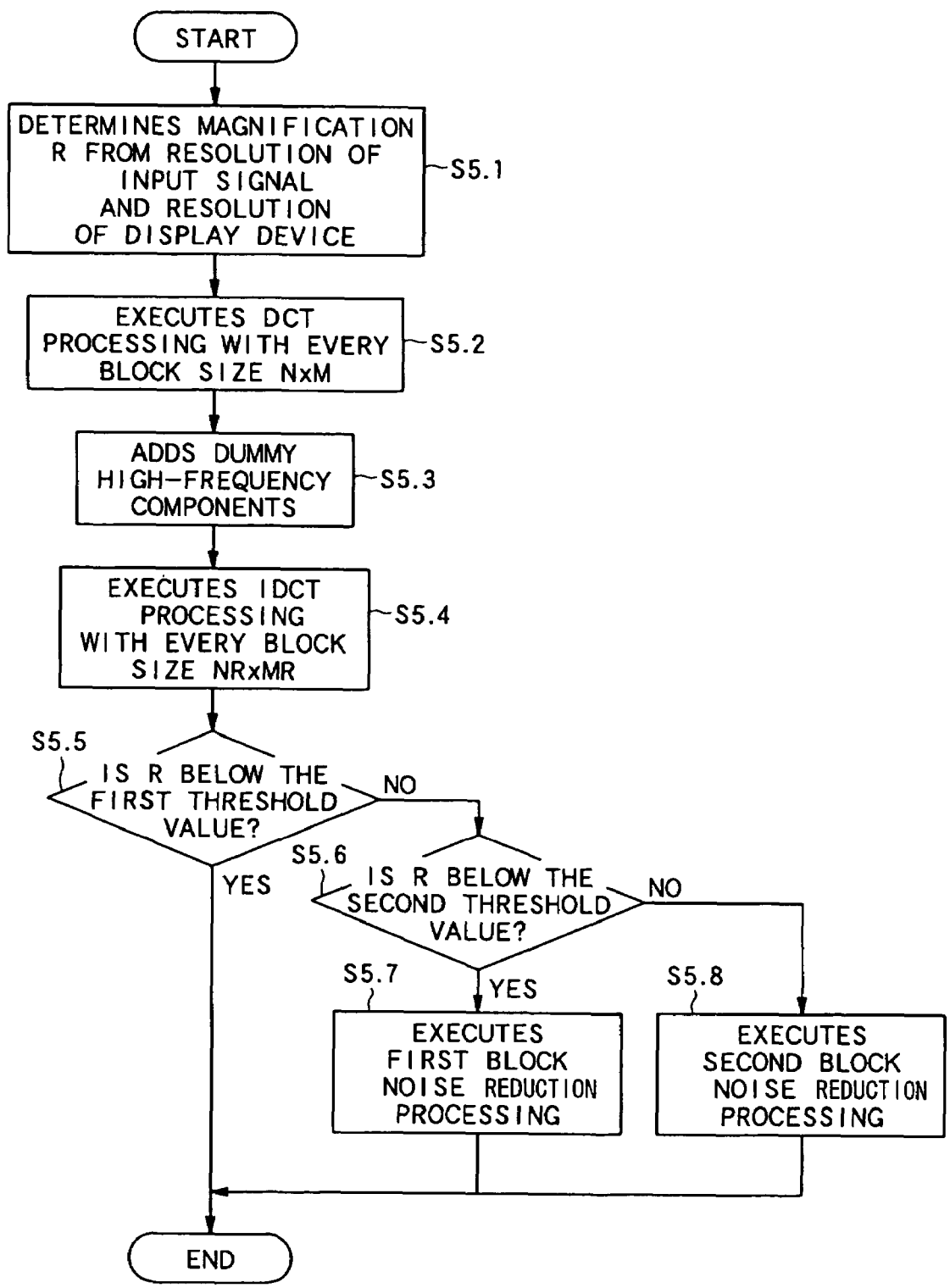
FIG. 5 is a flow chart explaining the resolution conversion method according to a second embodiment of the present invention.

With reference to a flow chart of FIG. 5, the flow of the processing that is performed in the resolution conversion method according to the second embodiment of the present invention will now be explained.

The increasing magnification (hereinafter referred as R) of an image, as in the case of the first embodiment, is determined from the resolution of the input signal and the resolution of a display device (not illustrated) (s5.1). Although the value of the R may be different according to a respective one of the horizontal and vertical directions, for brevity of explanation the following explanation will be made using the same value of increasing magnification with respect to the both directions.

Subsequently, as in the first embodiment, with one block having a size composed of N×M (for example both the N and the M are 8) pixels, orthogonal transform processing such as DCT processing is performed every block, thereby converting from a time/space domain signal into a frequency domain signal (s5.2).

And, in the same way as in the first embodiment, as illustrated in FIGS. 4A to 4C, to the outside of the high-frequency domain components that are on the right and bottom sides of each block, there are added dummy high-frequency domain components (s5.3, in the example of FIG. 4C, to the outside of the N×M block there are respectively added X and Y pixels as dummy high-frequency domain components, thereby making the block have a size of (N+X)×(M+Y). Also, in other words, the block size can also be referred to as "NR×MR".) In this case, if each of the N and M is provided as 8 and the magnification R is provided as described above (R:2), the resulting each of the X and Y is 8.

Further, in the same way as in the first embodiment, inverse orthogonal transform such as IDCT (inverse DCT) is performed every block having added thereto the above-described dummy high-frequency components, thereby converting from a frequency domain signal into a time/space domain signal (s5.4).

And, in the second embodiment of the present invention, when the above-described increasing magnification R is smaller (s5.5) than a first threshold value that is preset, any block noise reduction processing is not performed and, when the increasing magnification is larger than the first threshold value and smaller than a second threshold value (s5.6), first block noise reduction processing is performed (s5.7). Further, in a case where the increasing magnification is larger than the second threshold value, second block noise reduction processing is performed (s5.8). However, it is assumed in that case that the first threshold value be smaller than the second threshold value. Here, as the first threshold value and the second threshold value, it is confirmed through evaluation of the image quality that, in a case where each of the above-described N and M defining a block size is 8, that the first threshold value suitably is a magnification of 10/8 to 15/8, preferably a magnification of 13/8 while the second threshold value suitably is a magnification of 15/8 to 20/8, preferably a magnification of approximately 17/8.

Here, the first block noise reduction processing and the second block noise reduction processing will be explained. The first block noise reduction processing works as suitable processing in a case where the occurrence of block noises is relatively weak, whereas the second block noise reduction processing suitably works in a case where the occurrence of block noises is intense.

As an example of the above-described first block noise reduction processing, for example, median filter processing is performed. Here, how to perform the median filter processing will be explained, by way of example, with reference to FIGS. 3A and 3B.

Figure 3A:
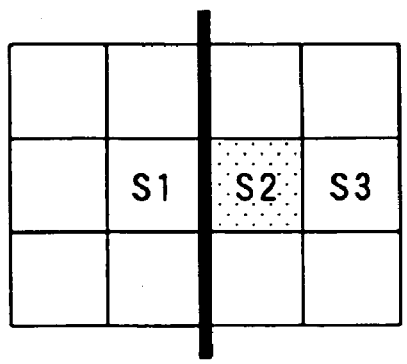
FIGS. 3A and 3B are conceptual views explaining block noise reduction processing according to the embodiment of the present invention.
Figure 3B:
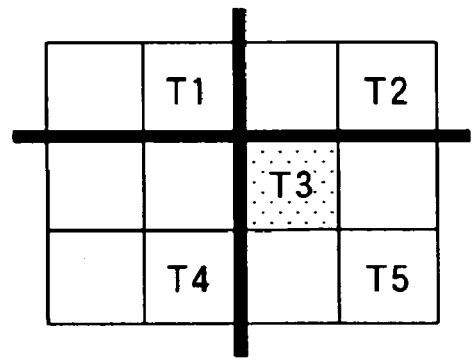

FIG. 3A illustrates a block border that has been viewed in the vertical direction while FIG. 3B illustrates the borders (corners) that have been viewed in both of the horizontal and vertical directions. In FIG. 3A, the level of the pixel S2 located at the block border that goes along the vertical direction (the same is obviously true of the horizontal direction as well) is replaced with the pixel value that, among the three pixels including the pixel S2, and the pixels S1 and S3 on both sides thereof, corresponds to the medium pixel level. For example, if the pixel level of S1 is 30; the pixel level of S2 is 50; and the pixel level of S3 is 40, the pixel level 40 of S3 is used as the pixel value at the location of the pixel S2 that is located at the border. Also, the pixel T3 that in FIG. 3B is located at a border in both of the horizontal and vertical directions, similarly, is replaced with the pixel value corresponding to the pixel level that is located at the medium among the five pixels including the peripheral pixels T1, T2, T4, and T5.

Also, as an example of the second block noise reduction processing, there is used the averaging processing (boxcar low-pass filter) which was explained in regarding with the first embodiment of the present invention.

As was stated above, as the first and second block noise reduction processing, an explanation was given, respectively, of the examples that use median filter processing and averaging processing. However, in the second embodiment of the present invention, so long as the first block noise reduction processing works as suitable processing in a case where the occurrence of block noises is relatively weak, whereas the second block noise reduction processing suitably works in a case where the occurrence of block noises is intense, the method for performing block noise reduction processing may be other ones. The second embodiment of the present invention is not limited to that method for performing block noise reduction processing.

And, regarding a construction example of the device for resolution conversion according to the second embodiment of the present invention, since that example is the same as that in case of the first embodiment, an explanation relevant thereto will be omitted.

Also, an arrangement which has been embodied by comprising various kinds of devices for realizing the functions of the above-described embodiments, and supplying, to a computer within an apparatus or system connected to those devices so as to operate them, program codes of software used to realize the functions of the above-described embodiments, and operating them in accordance with the programs stored within the computer (CPU or MPU) of that system or apparatus is also included under the technical category of the present invention.

Also, in this case, the program codes themselves of the software serve to realize the functions of the above-described embodiments. Therefore, those program codes themselves and means for supplying those program codes to the computer, such as a recording medium having the program codes stored therein, compose the present invention. As the recording media for storing therein those program codes, there can be used, for example, flexible disks, hard disks, optical disks, magneto-optical disks, CD-ROMs, magnetic tapes, non-volatile memory cards, ROM's, etc.

Also, not only in a case where the functions or features of the above-described embodiments are realized by executing the program codes supplied to the computer but also in a case where those program codes realize the functions or features of the above-described embodiments in co-operation with the OS (Operating System) or other application software which is working on the computer, such program codes are also obviously included in the embodiments of the invention.

Further, in a case, as well, where, after the program codes that were supplied have been stored in a memory that is equipped to a function-expanding board of the computer or to a function-expanding unit connected to the computer, a CPU, etc. that are equipped to that function-expanding board or function-expanding unit execute part or the whole of the actual relevant processing and the processing realizes the functions of the above-described embodiments, such program codes are also obviously included under the category of the present invention.

This application claims priority from Japanese Patent Application No.2004-018797 filed Jan. 27, 2004, which is hereby incorporated by reference herein.

What is claimed is:

1. A resolution conversion device for performing resolution conversion of an image having increasing magnification, comprising:

orthogonal transform means that converts an input signal into a frequency domain signal with use of an orthogonal transform;

dummy high-frequency component adding means that produces dummy high-frequency domain components to a high-frequency domain side of the converted frequency domain signal in accordance with the increasing magnification of the image;

inverse orthogonal transform means that converts the signal having added thereto the dummy high-frequency domain components into a temporal domain signal with use of an inverse orthogonal transform;

image processing means that performs block noise reduction processing in accordance with the increasing magnification of the image; and control means that controls the orthogonal transform means, dummy high-frequency component adding means, inverse orthogonal transform means, and image processing means in accordance with the increasing magnification of the image;

wherein the control means has the function to control the image processing means so that, when the increasing magnification of the image falls within a prescribed range of magnifications, the image processing means may perform first block noise reduction processing, wherein, when the increasing magnification is larger than the magnifications of the prescribed range, the image processing means may perform second block noise reduction processing that is different from the first block noise reduction processing, wherein, when that increasing magnification is smaller than the magnifications of the prescribed range, the image processing means does not perform any block noise reduction processing, and wherein the lower limit of said prescribed range is at least 10/8 and not more than 15/8, and the upper limit of said range is at least 15/8 and not more than 20/8.

* * * * *